United States Patent
Pitchumani et al.

(10) Patent No.: US 12,174,696 B2
(45) Date of Patent: *Dec. 24, 2024

(54) STORAGE DEVICE WITH DATA QUALITY METRIC AND SELECTABLE DATA RECOVERY SCHEME

(71) Applicant: Samsung Electronics Co., Ltd., Suwon-si (KR)

(72) Inventors: Rekha Pitchumani, Oak Hill, VA (US); Zongwang Li, Dublin, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/106,474

(22) Filed: Feb. 6, 2023

(65) Prior Publication Data

US 2023/0185661 A1 Jun. 15, 2023

Related U.S. Application Data

(63) Continuation of application No. 17/207,600, filed on Mar. 19, 2021, now Pat. No. 11,593,197.

(60) Provisional application No. 63/130,399, filed on Dec. 23, 2020.

(51) Int. Cl.
*G06F 11/00* (2006.01)
*G06F 11/07* (2006.01)
*G06F 11/10* (2006.01)
*G06F 11/14* (2006.01)

(52) U.S. Cl.
CPC ........ *G06F 11/1044* (2013.01); *G06F 11/076* (2013.01); *G06F 11/1451* (2013.01); *G06F 11/1469* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 7,984,357 B2 | 7/2011 | Kirscht et al. | |
| 9,202,517 B1* | 12/2015 | Barlow | G11B 20/10305 |
| 9,477,550 B2 | 10/2016 | Goodman et al. | |
| 9,998,151 B2* | 6/2018 | Kim | G06F 11/1048 |
| 10,108,481 B1 | 10/2018 | Kataria et al. | |

(Continued)

FOREIGN PATENT DOCUMENTS

| | | |
|---|---|---|
| CN | 107430537 A | 12/2017 |
| CN | 107766172 A | 3/2018 |

(Continued)

OTHER PUBLICATIONS

Notice of Allowance for U.S. Appl. No. 17/207,600, mailed Oct. 20, 2022.

(Continued)

*Primary Examiner* — Mujtaba M Chaudry
(74) *Attorney, Agent, or Firm* — Renaissance IP Law Group LLP

(57) ABSTRACT

A storage device is disclosed. The storage device may include storage for data. A controller may manage writing the data to the storage and reading the data from the storage. A data quality metric table may map a first number of errors to a first data quality metric and map a second number of errors to a second data quality metric. A transmitter may return the data quality metric table to a host.

20 Claims, 11 Drawing Sheets

| Data Quality Metric Table | | | |
|---|---|---|---|
| No. Unsatisfied Check Equations | BER | Error Recovery Latency (μs) | DQ Level |
| 0 | 0 | 0 | 100 |
| 1-10 | $10^{-20}$-$10^{-10}$ | 2 | 99 |
| 11-20 | $10^{-10}$-$2\times10^{-8}$ | 5 | 98 |
| 21-40 | $2\times10^{-8}$-$10^{-8}$ | 10 | 97 |
| ⋮ | | | |
| 401- | $\geq 10^{-1}$ | ∞ | 0 |

(56) References Cited

U.S. PATENT DOCUMENTS

| | | |
|---|---|---|
| 10,127,264 B1 * | 11/2018 | Pyle .................. G06F 16/2365 |
| 10,268,541 B2 | 4/2019 | Niu et al. |
| 10,474,527 B1 | 11/2019 | Sun |
| 10,496,473 B2 | 12/2019 | Das et al. |
| 10,769,018 B2 | 9/2020 | Li |
| 10,938,417 B2 | 3/2021 | Kuo |
| 2005/0268203 A1 | 12/2005 | Keays et al. |
| 2007/0089031 A1 | 4/2007 | Huffman et al. |
| 2009/0241008 A1 * | 9/2009 | Kim .................... H03M 13/353 714/755 |
| 2009/0319843 A1 | 12/2009 | Meir et al. |
| 2012/0079353 A1 * | 3/2012 | Liikanen ............... H03M 13/41 714/E11.034 |
| 2015/0121167 A1 | 4/2015 | Goodman et al. |
| 2015/0286528 A1 | 10/2015 | Cai et al. |
| 2015/0349807 A1 * | 12/2015 | Vernon ............. H03M 13/3715 714/774 |
| 2016/0085621 A1 | 3/2016 | Motwani et al. |
| 2017/0116070 A1 * | 4/2017 | Alrod ..................... G11C 16/26 |
| 2018/0089024 A1 | 3/2018 | Hahn et al. |
| 2018/0341580 A1 | 11/2018 | Miao |
| 2019/0213078 A1 | 7/2019 | Date et al. |
| 2019/0385684 A1 * | 12/2019 | Bhatia .................. G11C 29/021 |
| 2020/0019458 A1 * | 1/2020 | Cadloni ................ G06F 11/108 |
| 2020/0019459 A1 | 1/2020 | Cadloni et al. |
| 2020/0026602 A1 | 1/2020 | Tai et al. |
| 2020/0089569 A1 | 3/2020 | Cadloni et al. |
| 2020/0127685 A1 * | 4/2020 | Chen .................. H03M 13/152 |
| 2020/0174886 A1 | 6/2020 | Li |
| 2020/0278906 A1 | 9/2020 | Bains et al. |
| 2020/0341870 A1 | 10/2020 | Frolikov |

FOREIGN PATENT DOCUMENTS

| | | |
|---|---|---|
| CN | 111274061 A | 6/2020 |
| TW | 202019100 A | 5/2020 |

OTHER PUBLICATIONS

Office Action for U.S. Appl. No. 17/207,600, mailed May 20, 2022.
Wang, Xuan et al., "Design and Implementation of NAND Flash ECC Check-Out System Based on FPGA," FPGA and NAND Flash ECC, Electronic Design Engineering, vol. 26, No. 18, Sep. 2018, 5 pages.

* cited by examiner

335

| RRL Table | | | |
|---|---|---|---|
| NSID/Set | RRL | Accepted Latency (μs) | Accepted DQ |
| 0 _515_ | 4 _520_ | <800 _525_ | 8 _530_ |
| 1 _535_ | 4 _540_ | <800 _545_ | 10 _550_ |
| 2 | 1 | <2000 | 5 |
| 3 | 5 | <500 | 23 |
| ⋮ | | | |

505 → row 0
510 → row 1

| Data Quality Metric Table | | | |
|---|---|---|---|
| No. Unsatisfied Check Equations | BER | Error Recovery Latency (μs) | DQ Level |
| 0 _615_ | 0 _620_ | 0 _625_ | 100 _630_ |
| 1-10 _635_ | $10^{-20}$-$10^{-10}$ _640_ | 2 _645_ | 99 _650_ |
| 11-20 | $10^{-10}$-$2\times10^{-8}$ | 5 | 98 |
| 21-40 | $2\times10^{-8}$-$10^{-8}$ | 10 | 97 |
| ⋮ | | | |
| 401- | $\geq 10^{-1}$ | ∞ | 0 |

605 → row 0
610 → row 1-10

FIG. 6

STORAGE DEVICE WITH DATA QUALITY METRIC AND SELECTABLE DATA RECOVERY SCHEME

RELATED APPLICATION DATA

This application is a continuation of U.S. patent application Ser. No. 17/207,600, filed Mar. 19, 2021, now allowed, which claims the benefit of U.S. Provisional Patent Application Ser. No. 63/130,399, filed Dec. 23, 2020, which are both incorporated by reference herein for all purposes.

FIELD

The inventive concepts relate generally to storage devices, and more particularly to improve error correction processing.

BACKGROUND

Host machines may write data to and read data from storage devices. On occasion, when processing a host read request, a storage device may detect an error. Error correcting codes provide a mechanism by which such errors might be corrected. But applying error correction may take additional time: the storage device may end up taking more time to respond to the read request than is acceptable to the host. In addition, error correction techniques consume power, increasing the operating expense for the storage device.

A need remains to improve the performance of a storage device to reduce the time required to perform error correction and reduce the power used by the storage device.

BRIEF DESCRIPTION OF THE DRAWINGS

FIG. 5 shows an example of the Read Recovery Level (RRL) table of FIG. 3 supporting the use of a data quality metric in the storage device of FIG. 1, according to embodiments of the inventive concept.

FIG. 6 shows an example of the data quality metric table of FIG. 3 in the storage device of FIG. 1, according to embodiments of the inventive concept.

DETAILED DESCRIPTION

Figure 1:
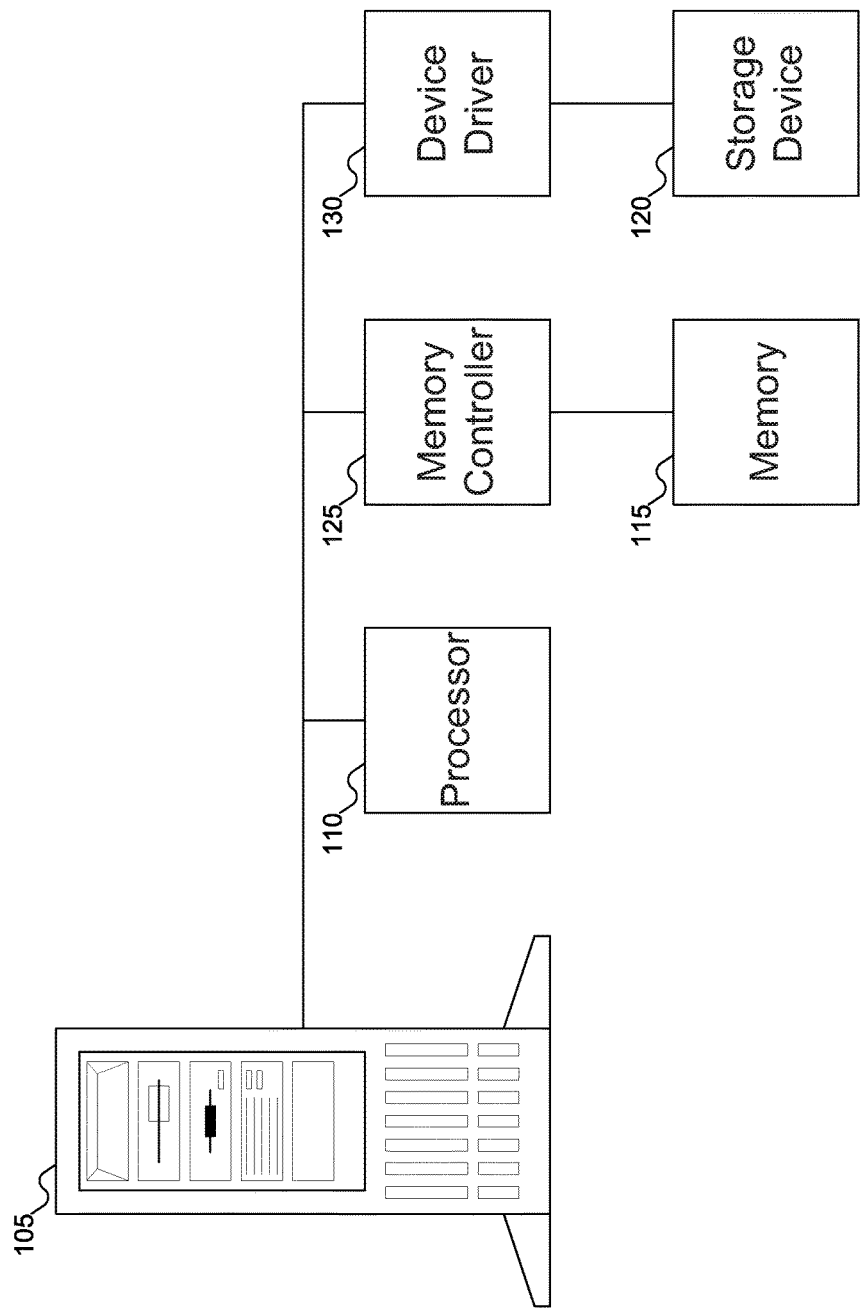
FIG. 1 shows a system including a storage device supporting a data quality metric, according to embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Data recovery from Not-And (NAND) flash chips inside a storage device, such as a Solid State Drive (SSD), may be done by error correction coding (ECC). Based on the ECC decoding results, an SSD only reports either a correction or a failure to correct data in a block in which an error was detected.

There are applications which may tolerate data error to a pre-determined rate. In addition, a protocol, such as Non-Volatile Memory Express (NVMe), may support read recovery levels, which allows configuring a storage device to various levels of effort to be attempted when attempting to recover data from a block with an error (or when to return an error). With this data quality feature, the estimated time to recover data from a block with an error may be computed in advance based on the protocol read recovery levels requirement, without attempting to use a recovery scheme that may have a long latency and/or require additional power to execute.

Non-Volatile Memory (NVM) may support a configurable Read Recovery Level (RRL) attribute that balances the completion time for read commands with the amount of error recovery to be applied to those read commands (when an error occurs). The RRL attribute may be applied to an NVM Set associated with the RRL attribute. A namespace associated with an NVM Set may inherit the RRL of that NVM Set. If NVM Sets are not supported, all namespaces in the NVM subsystem may use an identical RRL. Table 1 shows an example RRL table ("O" stands for "optional", "M" stands for "mandatory").

TABLE 1

| Level | Optional/Mandatory | Description | Recovery |
|---|---|---|---|
| 0 | Optional | | Maximum |
| 1 | Optional | | ↓ |
| 2 | Optional | | |
| 3 | Optional | | |
| 4 | Mandatory | Default | |
| 5 | Optional | | |
| 6 | Optional | | |
| 7 | Optional | | |
| 8 | Optional | | |
| 9 | Optional | | |
| 10 | Optional | | |
| 11 | Optional | | |
| 12 | Optional | | |
| 13 | Optional | | |
| 14 | Optional | | |
| 15 | Mandatory | Fast Fail | Minimum |

A storage device may include a data quality feature implementation. In a storage device without the data quality metric, when attempting to read the data, the storage device may need perform a brute force method or simplified brute force method to try all error recovery schemes based on the error recovery enhancement order. A brute force method may be to try error recovery schemes in a sequence—for example, from fastest to slowest—until either some scheme results in a successful error recovery or all error recovery schemes have been tried. A simplified brute force method may be to try error recovery schemes in a sequence—for example, from fastest to slowest—until either some scheme results in a successful error recovery or the time spent trying to read and recover the data has exceeded the available time (that is, the latency the host expects from the storage device). To try all error recovery schemes in this manner may require a long latency and additional power consumption, especially for poor data quality.

In contrast, in a storage device with the data quality metric, during the namespace creation during the admin command stage, the RRL table may be built. The RRL of each namespace may be set by the host using protocol feature commands. For Quality of Service (QoS) control purpose, a host may issue verify( ) or get_LBA_status( ) commands, in response to which the storage device data quality metric estimator may return the data quality metric level to the host quickly without applying a real data recovery procedure (which may have a long latency and/or require additional power consumption to execute). During the normal read( ) command stage, a first data quality metric estimator module may calculate data quality metrics. Based on the data quality metrics and the RRL attribute, the error recovery mode selector may select an error recovery scheme to be used. Because the RRL attribute and the data quality metrics may identify a single error recovery scheme to be used, the storage device may avoid having to try multiple error recovery schemes in a brute force method or a simplified brute force method to attempt to find an error recovery scheme that may succeed. For example, for data with the poorest data quality, the storage device may know error recovery is unlikely to succeed or may exceed the RRL attribute. In such cases, the storage device may return the data directly to the host and bypass error recovery.

Data Quality Estimation Algorithm

For each ECC, there may be a parity check matrix H associated with it. For a code of (N,K) with N as the code length and K the data length, H may be a matrix with N-K independent rows and N columns as shown below:

$$H = \begin{bmatrix} h_{11} & h_{12} & h_{13} & & h_{1(N-2)} & h_{1(N-1)} & h_{1N} \\ h_{21} & h_{22} & h_{23} & \cdots & h_{2(N-2)} & h_{2(N-1)} & h_{2N} \\ h_{31} & h_{32} & h_{33} & & h_{3(N-2)} & h_{3(N-1)} & h_{3N} \\ \vdots & & & \ddots & & & \vdots \\ h_{(N-K-2)1} & h_{(N-K-2)2} & h_{(N-K-2)3} & & h_{(N-K-2)(N-2)} & h_{(N-K-2)(N-1)} & h_{(N-K-2)N} \\ h_{(N-K-1)1} & h_{(N-K-1)2} & h_{(N-K-1)3} & \cdots & h_{(N-K-1)(N-2)} & h_{(N-K-1)(N-1)} & h_{(N-K-1)N} \\ h_{(N-K)1} & h_{(N-K)2} & h_{(N-K)3} & & h_{(N-K)(N-2)} & h_{(N-K)(N-1)} & h_{(N-K)N} \end{bmatrix}$$

An ECC codeword $C=(c_1, c_2, c_3, \ldots c_N)$ of length N should satisfy the linear equations in the parity check matrix H: in other words, the equation $HC=0$ should be satisfied. Note that ECC codeword C may be the same for a given data, regardless of the parity check matrix H of the individual ECCs.

As matric H includes N-K rows, the equation $HC=0$ may include N-K linear equations (which may also be termed "check equations", as they check whether the codeword may have errors). The encoded codeword C may be stored on a track, in a NAND cell, or using some other technique during the write stage. There may be some errors when the codeword is read out from storage location: the presence of such errors may be denoted as corrupted codeword as $\tilde{C}$. In general, it may be expected that the number of linear equations in $H\tilde{C}$ that are not satisfied (i.e., that are not equal to 0), the larger the number of error in the corrupted codeword $\tilde{C}$. The ECC decoder may attempt to use all decoding algorithms to try to find a codeword $\tilde{C}$ which has the closest Hamming distance to C and that may satisfy the equation $H\tilde{C}=0$.

In storage devices without the data quality metric, either the equation $H\tilde{C}=0$ is satisfied and the data may be successfully recovered, or $H\tilde{C}\neq 0$ and the data may not be successfully recovered (and an error may be returned). In storage devices with the data quality metric, during use of the ECC decoder, the ECC decoder may count the number of linear equations in HC that are violated (i.e., that do not equal 0): this count of violated linear equations may be used as a metric for data quality. There may be a relationship between the number of violated linear equations and the bit error rates (BER) in a codeword. Thus, a relationship between the BER and the number of violated linear equations may be seen:

The Data Quality Metric Estimator table is shown in Table 2 below.

TABLE 2

| Number of violated linear equations | BER | Data quality level (0-100) | Recovery latency ($\mu s$) |
|---|---|---|---|
| 0 | 0 | 100 (perfect) | 0 |
| 1-10 | 1e-20-1e-10 | 99 (excellent) | 2 |
| 11-20 | 1e-10-2e-8 | 98 | 5 |
| 21-40 | 2e-8-1e-8 | 97 | 10 |
| ... | ... | ... | |
| 401-... | >1e-1 | 0 (unrecoverable) | Infinite |

In general, the storage device may provide a data quality metric based on the number of violated linear equations (V) relative to the number of rows in the parity check matrix H (this number may be labeled "M"). Thus, the data quality metric may be represented as (V/M) %. Because relationship between the number of violated linear equations and the bit error rate may be non-linear, an example data quality table, such as that shown in Table 2 above, may be built based on the number of violated linear equations for a certain ECC decoder.

FIG. 1 shows a system including a storage device supporting a data quality metric, according to embodiments of the inventive concept. In FIG. 1, machine 105, which may also be termed a host, may include processor 110, memory 115, and storage device 120. Processor 110 may be any variety of processor. (Processor 110, along with the other components discussed below, are shown outside the machine for ease of illustration: embodiments of the inventive concept may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be used, for example, to store initial parameters (or ranges of values for initial parameters, along with what types of behaviors the ranges of values represent) used to initialize the simulation. Storage device 120 may be accessed using device driver 130. While FIG. 1 uses the generic term "storage device", embodiments of the inventive concept may include any storage device formats that may benefit from the use of data quality metrics, examples of which may include hard disk drives and Solid State Drives (SSDs). Any reference to "SSD" below should be understood to include such other embodiments of the inventive concept.

Figure 2:
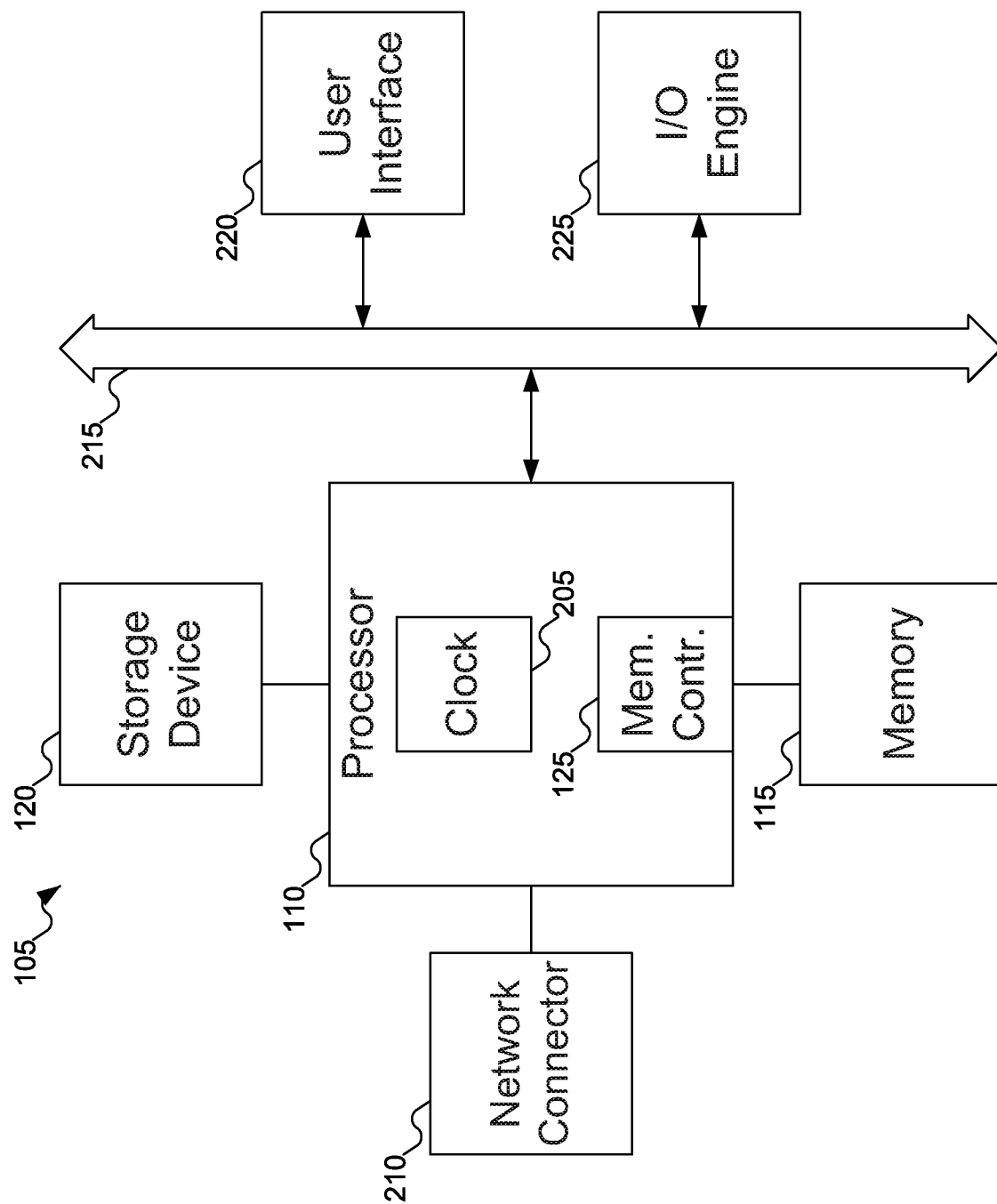
FIG. 2 shows details of the machine of FIG. 1, according to embodiments of the inventive concept.

FIG. 2 shows details of machine 105 of FIG. 1, according to embodiments of the inventive concept. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
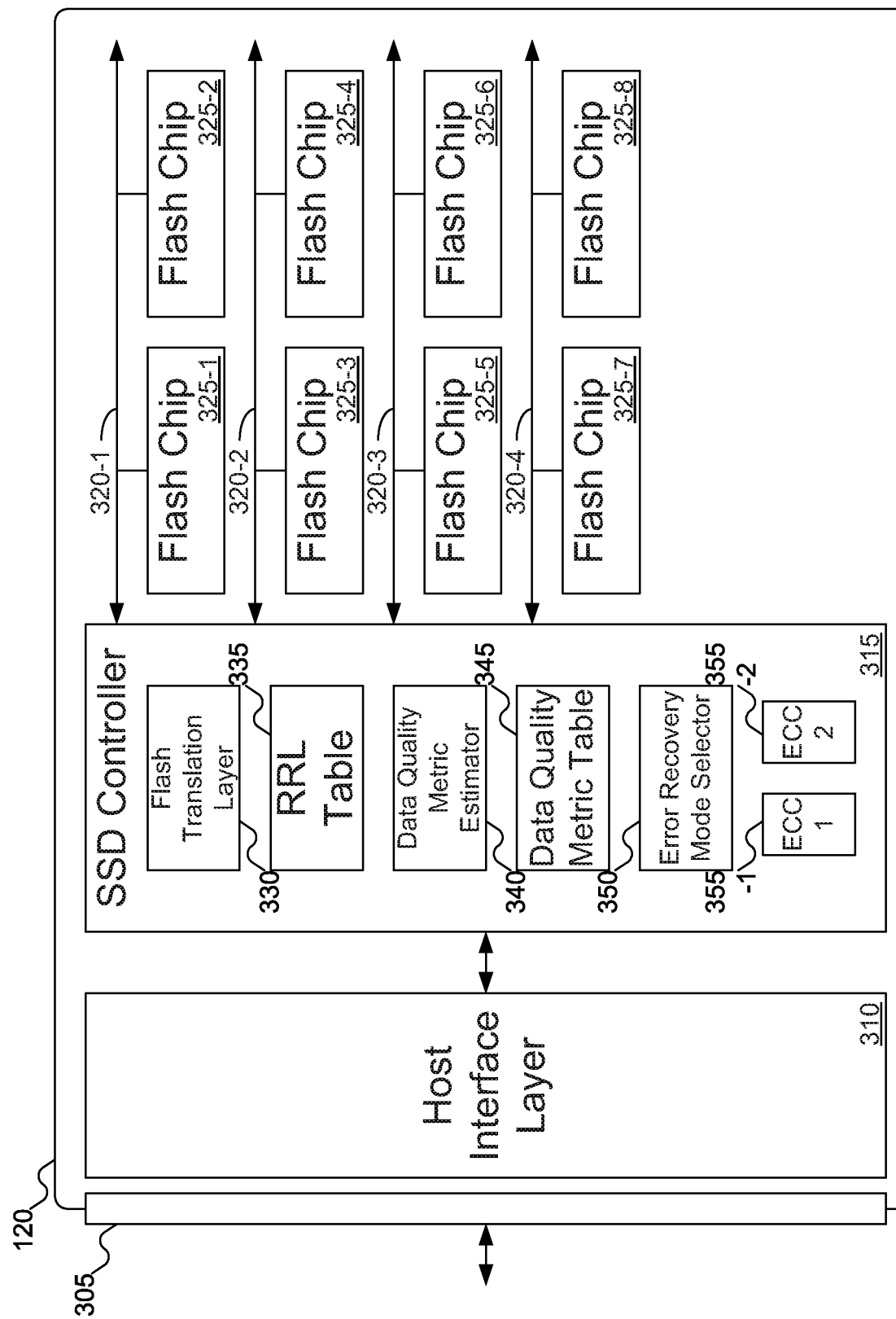
FIG. 3 shows details of the storage device of FIG. 1 when implemented as a Solid State Drive (SSD), according to embodiments of the inventive concept.

FIG. 3 shows details of storage device 120 of FIG. 1 when implemented as an SSD, according to embodiments of the inventive concept. In FIG. 3, SSD 120 may include interface 305. Interface 305 may be an interface used to connect SSD 120 to machine 105 of FIG. 1. SSD 120 may include more than one interface 305: for example, one interface might be used for block-based read and write requests, and another interface might be used for key-value read and write requests. While FIG. 3 suggests that interface 305 is a physical connection between SSD 120 and machine 105 of FIG. 1, interface 305 may also represent protocol differences that may be used across a common physical interface. For example, SSD 120 might be connected to machine 105 using a U.2 or an M.2 connector, but may support block-based requests and key-value requests: handling the different types of requests may be performed by a different interface 305.

SSD 120 may also include host interface layer 310, which may manage interface 305. If SSD 120 includes more than one interface 305, a single host interface layer 310 may manage all interfaces, SSD 120 may include a host interface layer for each interface, or some combination thereof may be used.

SSD 120 may also include SSD controller 315, various channels 320-1, 320-2, 320-3, and 320-4, along which various flash memory chips 325-1, 325-2, 325-3, 325-4, 325-3, 325-6, 325-7, and 325-8 may be arrayed. SSD controller 315 may manage sending read requests and write requests to flash memory chips 325-1 through 325-8 along channels 320-1 through 320-4. Although FIG. 3 shows four channels and eight flash memory chips, embodiments of the inventive concept may include any number (one or more, without bound) of channels including any number (one or more, without bound) of flash memory chips.

Within each flash memory chip, the space may be organized into blocks, which may be further subdivided into pages, and which may be grouped into superblocks. The page is typically the smallest unit of data that may be read or written on an SSD. Page sizes may vary as desired: for example, a page may be 4 KB of data. If less than a full page is to be written, the excess space is "unused".

While pages may be written and read, SSDs typically do not permit existing data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the inventive concept, the unit of erasure may differ from the block: for example, it may be a superblock, which may be a set of multiple blocks.)

SSD controller 315 may include flash translation layer 330 (which may be termed more generally a logical-to-physical translation layer, for storage devices that do not use flash storage), Read Recover Level (RRL) table 335, data quality metric estimator 340, data quality metric table 345, error recovery mode selector 350, and error correction code modules 355-1 and 355-2. Flash translation layer 330 may handle translation of LBAs or other logical IDs (as used by processor 110 of FIG. 1) and physical block addresses (PBAs) or other physical addresses where data is stored in flash chips 325-1 through 325-8. RRL table 335 may be used to store information about the default preferred RRL to be applied to a namespace, along with other information regarding error recovery. RRL table 335 is discussed further with reference to FIG. 5 below.

Data quality metric estimator 340 may take information about the data that was read from flash chips 325-1 through 325-8 and determine what error recovery mechanism to use. To understand how this works requires some understanding of how error correcting codes (ECCs) work.

In general, each ECC, which may be implemented using ECC modules 355-1 and 355-2, may include a parity check matrix H. The parity check matrix H may include n-k rows and n columns, where n is the length of a codeword and k is the rank of the code. Since the parity check matrix H includes n columns and a codeword C is of length n, the product HC may be a vector with n-k rows. The codeword C may be generated based on the data being written, and may be selected so that HC is 0. Thus, the product HC may represent a set of n-k linear equations. When data is written to flash chips 325-1 through 325-8, the codeword C may also be written to flash chips 325-1 through 325-8.

When data is read, and in particular when the codeword C is read, errors may occur, resulting in the codeword C being read incorrectly. In such situations, the corrupted codeword may be represented as $\tilde{C}$. Since $\tilde{C}$ may have errors (and therefore might not be a codeword itself), $H\tilde{C}$ may not equal 0 as would HC: some of the linear equations may not be satisfied (or, put another way, some of the linear equations may be violated). The ECC module may then attempt to find another codeword $\overline{C}$ that is as "close" to $\tilde{C}$ as possible and for which $H\overline{C}$ is 0. ("Closeness" may be measuring using Hamming distance, which measures the number of characters in the codeword that need to be altered to change one word to another.) If such a codeword $\overline{C}$ may be found, then the ECC module may be able to correct the data read from flash chips 325-1 through 325-8; if no codeword $\overline{C}$ may be found, then the data may not be correctable and an error may be returned.

Figure 4:
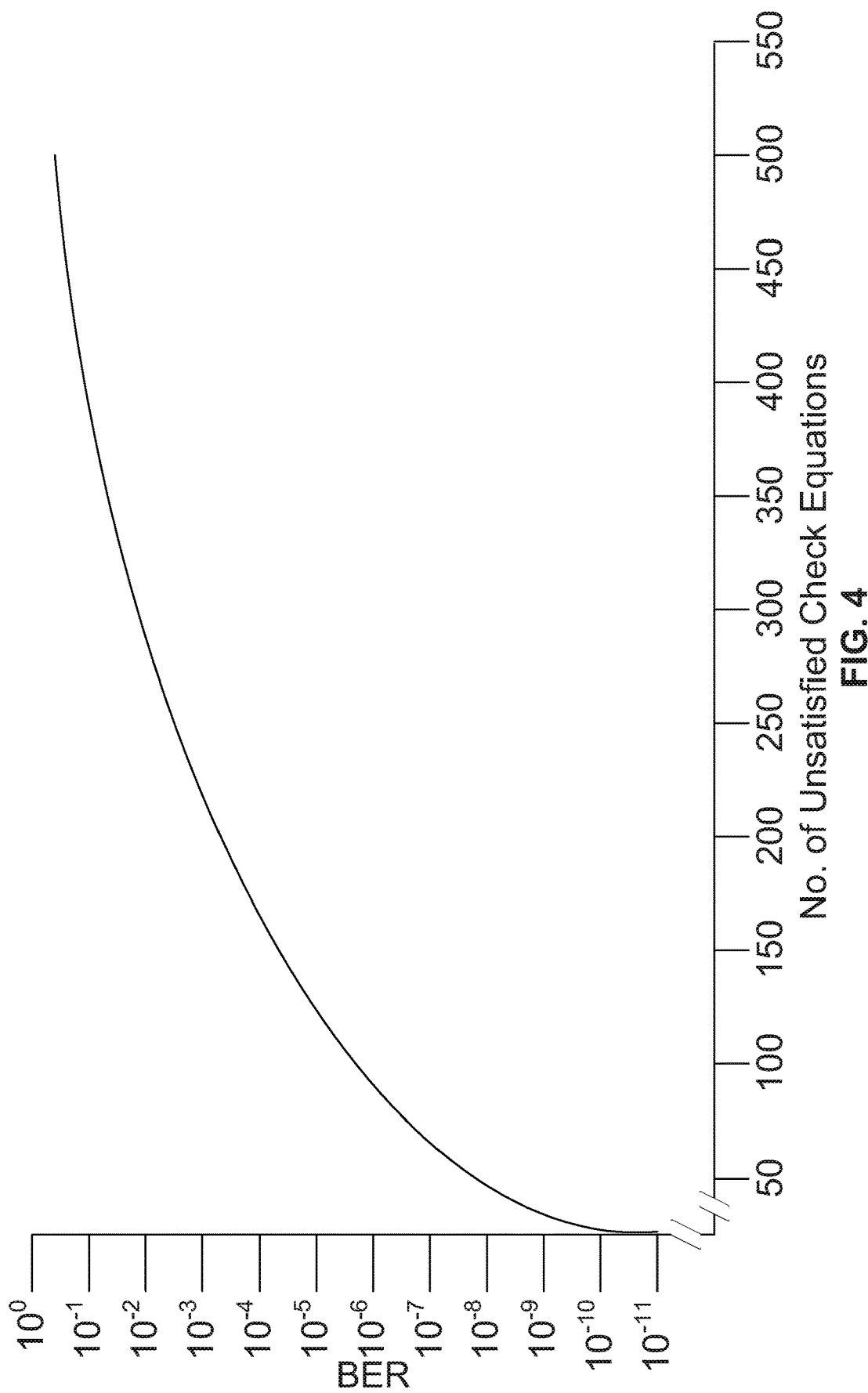
FIG. 4 shows an example of a graph correlating bit error rates with the number of violated check equations, according to embodiments of the inventive concept.

With this understanding, data quality metric estimator 340 may be understood. Turning momentarily to FIG. 4, FIG. 4 shows a graph of the relationship between the number of violated (or unsatisfied) linear equations in $H\tilde{C}$ and the bit error rate (BER) of the data. As may be seen, there is a correlation between the number of violated linear equations in $H\tilde{C}$ and the BER. Thus, as the number of violated linear equations in $H\tilde{C}$ increases, the number of errors in the read data may be expected to increase. (Note that while the correlation might not be linear and might not be monotonically increasing, overall the correlation is increasing. Thus, for example, going from 100 to 102 violated linear equations might not necessarily result in an increase in the BER, going from 100 to 400 violated linear equations may be expected to result in an increase in the BER.) Thus, by examining the number of violated linear equations, an estimate of the data quality may be determined.

Returning to FIG. 3, data quality metric estimator 340 may then determine the number of violated equations in $H\tilde{C}$ and use that information to determine an estimated metric for the data quality. Data quality metric estimator 340 may use data quality metric table 345 to assist data quality metric estimator 340 in mapping from the number of violated equations to the data quality metric. Data quality metric table 345 is discussed further with reference to FIG. 6 below.

Given the data quality metric estimated by data quality metric estimator 340, error recovery mode selector 350 may then select an error recovery mode to be applied to the data. SSD 120 may implement a number of different ECC modules, as demonstrated by ECC modules 355-1 and 355-2. While FIG. 3 shows two ECC modules 355-1 and 355-2, embodiments of the inventive concept may support any number (one or more) of ECC modules 355-1 and 355-2. Examples of ECC modules 355-1 and 355-2 may include read retry (attempting to read the data a second time), a Redundant Array of Independent Disks (RAID) decoder (applying a decoder used in reading data from a RAID), an ECC hardware decoder (using hardware to apply an ECC), and an ECC software decoder (using software to apply an ECC). ECC modules 355-1 and 355-2 may be implemented using a number of different approaches.

ECC modules 355-1 and 355-2 (as well as data quality metric estimator 340 and error recovery mode selector 350) may be implemented using an Application-Specific Integrated Circuit (ASIC), a Field Programmable Gate Array (FPGA), a central processing unit (CPU), a graphics processing unit (GPU), or a general purpose GPU (GPGPU). Depending on the implementation, firmware or software may also be used to implement ECC modules 355-1 and 355-2 (as well as data quality metric estimator 340 and error recovery mode selector 350).

One approach to performing ECC, which may be termed the brute force approach, is to attempt to apply each ECC module in turn, until either the error is corrected or no remaining ECC modules remain to be tried. A second approach is to attempt to apply each ECC module in turn until one of three conditions is met: the error is corrected, no remaining ECC modules remain to be tried, or the time spent processing a read request (including both the time spent receiving the read request and the time spent attempting to perform error correction) exceeds some maximum latency. In either case, if the error is successfully corrected, then the corrected data is returned to host 105 of FIG. 1; otherwise, an error is reported to host 105 of FIG. 1.

But these approaches have some drawbacks. First, because these approaches apply ECC modules 355-1 and 355-2 each in turn, the time required to perform error correction includes the time required to execute each ECC module in turn, which may be greater than the time required to execute a single ECC module. In addition, executing ECC modules requires power. Like time, executing multiple ECC modules may consume more power than just executing a single ECC module.

It may also happen that host 105 of FIG. 1 may expect a response to the read request in less time that might be needed to execute every ECC module. Thus, executing every ECC module in turn may end up exceeding the latency host 105 of FIG. 1 will tolerate. If the ECC module that may actually correct the error was not yet executed in the sequence, then the corrupt data might not be corrected before the latency host 105 of FIG. 1 will tolerate is exceeded, whereas the latency host 105 of FIG. 1 will tolerate might have permitted execution of that ECC module if the ECC modules had been executed in a different order.

To address these drawbacks, error recovery mode selector 350 may select a single ECC module 355-1 or 355-2 to execute, based on the data quality metric for the data. If the selected ECC module corrects the data, then the corrected data may be returned more rapidly than by trying multiple ECC modules in turn, and with lower power consumption (since only one ECC module is executed).

In some embodiments of the inventive concept, error recovery mode selector 350 may select the ECC module that is the best fit for the data quality metric. For example, error recovery mode selector 350 may select the fastest executing ECC module that is expected to be able to correct the error based on the data quality metric. In other embodiments of the inventive concept, error recovery mode selector 350 may select the most thorough ECC module that is expected to complete within the latency host 105 of FIG. 1 will tolerate (even if the data quality metric indicates that a less thorough ECC module might suffice).

There are also options that may be used when error recovery is not expected to succeed. In some embodiments of the inventive concept, if the data quality metric indicates that the time required to correct the error is greater than the latency host 105 of FIG. 1 will tolerate, then SSD 120 may simply return an error to host 105 of FIG. 1. In other embodiments of the inventive concept, error recovery mode selector 350 may select the most thorough ECC module that will complete within the latency tolerated by host 105 of FIG. 1, even if that ECC module may not be able to resolve the error. After all, it is possible that the ECC module might be able to resolve the error, even if the error seems too complicated for that ECC module to resolve.

In yet other embodiments, even if error correction is not performed, SSD 120 might return the data instead of an error. There are applications where some data errors may be tolerated. For example, playback of audio or video data may tolerate some errors in the data, since most of the data may be successfully presented to the user. Host 105 of FIG. 1 may specify the data quality metric to indicate that host 105 of FIG. 1 is willing to tolerate data that has some errors. SSD 120 may then compare the estimated data quality metric for the data with the data quality metric specified by host 105 of FIG. 1: if the data is of sufficient data quality to satisfy the host, the data may be returned to the host even if error correction does not occur or does not succeed.

As mentioned above, SSD controller 315 might include only one ECC module 355-1 or 355-2. But even if SSD controller 315 only includes one ECC module 355-1 or 355-2, it is possible to use the data quality metric to determine whether or not to apply the ECC module. For example, the latency host 105 of FIG. 1 will tolerate might or might not permit use of the ECC module, or it might be obvious that the ECC module is not capable of resolving the error even if there is sufficient time to execute the ECC module.

FIG. 5 shows an example of RRL table 335 of FIG. 3 supporting the use of a data quality metric in storage device 120 of FIG. 1, according to embodiments of the inventive concept. In FIG. 5, RRL 335 is shown. RRL 335 may store entries, such as entries 505 and 510. Each entry may map a namespace to an RRL, an accepted latency, and/or an accepted data quality metric. Note that while FIG. 5 shows RRL table 335 as including four columns, embodiments of the inventive concept may include more or fewer columns, depending on the implementation. For example, in some embodiments of the inventive concept RRL 335 may include the data quality metric but not the latency, or vice versa.

For example, entry 505 shows that namespace 515 maps to RRL 520, accepted latency 525, and accepted data quality metric 530, while entry 510 shows that namespace 535 maps to RRL 540, accepted latency 545, and accepted data quality metric 550. Accepted latencies 525 and 545 may represent default latencies that host 105 of FIG. 1 will tolerate for read requests associated with namespaces 515 and 535, respectively. Accepted data quality metrices 530 and 550 may represent default data quality metrices that host 105 of FIG. 1 applies to read requests associated with namespaces 515 and 535, respectively. Note that accepted latencies 525 and 545, and accepted data quality metrices 530 and 550, may be overridden for individual read requests, as discussed with reference to FIG. 7 below: accepted latencies 525 and 545, and accepted data quality metrices 530 and 550, may be used in situations where host 105 of FIG. 1 does not override the default latency/data quality metric.

In some embodiments of the inventive concept, the term "data quality metric" may also be used to include both the data quality metric and the latency. That is, in some embodiments of the inventive concept (particularly in embodiments of the inventive concept where RRL table 345 does not include a column for both accepted latency and accepted data quality metric), the term "data quality metric" may be understood to mean either the data quality metric itself or a latency. But in embodiments of the inventive concept where both terms "data quality metric" and "latency" are described, the term "data quality metric" is not intended to mean latency.

As discussed with reference to FIG. 3 above, host 105 of FIG. 1 may be willing to tolerate some errors in the data, even if the data may not be successfully corrected (or storage device 120 of FIG. 1 may not have time to perform error correction). This fact explains why RRL table 345 may include both an accepted latency and an accepted data quality metric, and why those data points might not agree. For example, RRL table 345 could specify that, for a particular namespace, data may have a data quality metric of at least 90, and yet specify a latency too small to permit error recovery (or at least, to permit error recovery of data with that data quality metric). With such data points, host 105 of FIG. 1 may indicate both little tolerance for delay in returning the data read from storage device 120 of FIG. 1, and yet a tolerance for some level of error in the data read from storage device 120 of FIG. 1. Other combinations (such as a low tolerance for errors in the data but a high tolerance for the time required to return the data) may also be specified. On the other hand, if the accepted latency and the accepted data quality metric "agree", then host 105 of FIG. 1 might specify only one such value (and omit the other if not included in RRL table 335 or leave the value blank in RRL table 335).

FIG. 6 shows an example of data quality metric table 345 of FIG. 3 in storage device 120 of FIG. 1, according to embodiments of the inventive concept. In FIG. 6, data quality metric table 345 is shown. Data quality metric table 345 may store entries, such as entries 605 and 610. Each entry may map a number of violated linear equations (which may be also be termed a number of errors) to a BER, an error recovery latency, and/or a data quality metric. Note that while FIG. 6 shows data quality metric table 345 as including four columns, embodiments of the inventive concept may include more or fewer columns, depending on the implementation. For example, in some embodiments of the inventive concept data quality metric table 345 may include the data quality metric but not the error recovery latency, or vice versa.

For example, entry 605 shows that number of errors 615 maps to BER 620, error recovery latency 625, and data quality metric 630, while entry 610 shows that number of errors 635 maps to BER 640, error recovery latency 645, and data quality metric 650. Error recovery latencies 625 and 645 may represent the estimated time required to perform error recovery for the identified number of errors. Data quality metrices 630 and 650 may represent the data quality metrices assigned to data with the identified number of errors. Thus, for example, entry 605 reflects that if there are no violated linear equations, then there are no errors in the data, which means that no time is needed to perform error correction and the data quality is considered perfect. In contrast, entry 610 reflects that there are a few violated linear equations, which would take an estimated 2 microseconds (µs) to correct: with such a number of errors, the data quality is high, but not necessarily perfect.

Using the information in data quality metric table 345 (in combination with the accepted latency and/or accepted data quality metric for the read request), error recovery mode selector 350 of FIG. 3 may select the appropriate ECC module to use. As discussed with reference to FIG. 3 above, error recovery mode selector 350 of FIG. 3 may then select an ECC module that may correct the error given the estimated data quality metric of the data, but within the limits of what host 105 of FIG. 1 will tolerate (in terms of data error and/or latency). Error recovery mode selector 350 of FIG. 3 may select the fastest ECC module that will (hopefully) correct the error given the data quality metric, the ECC module that is most likely to correct the error given the data quality metric (within the latency that host 105 of FIG. 1 will tolerate), or skip error correction entirely (if error correction is not projected to be successful within the latency host 105 of FIG. 1 will tolerate). Error recovery mode selector 350 of FIG. 3 may also decide, if error recovery was not attempted or did not succeed, whether to return an error result or the data with the errors present, based on the data quality that host 105 of FIG. 1 will accept.

Figure 7:
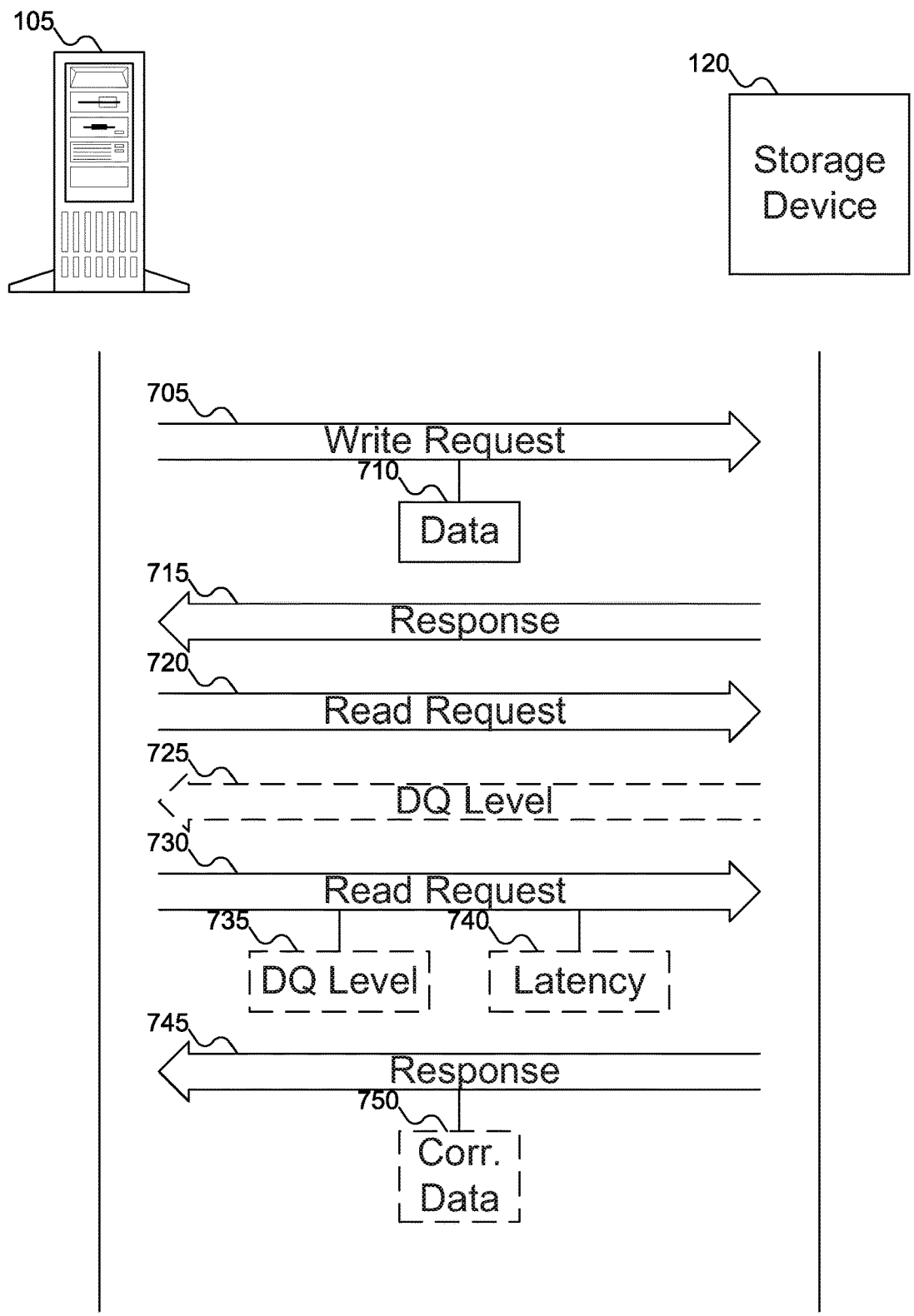
FIG. 7 shows messages being exchanged between the host of FIG. 1 and the storage device of FIG. 1, according to embodiments of the inventive concept.

FIG. 7 shows messages being exchanged between host 105 of FIG. 1 and storage device 120 of FIG. 1, according to embodiments of the inventive concept. In FIG. 7, host 105 may send write request 705 to storage device 120. Write request 705 may include data 710 to be written to storage device 120. Storage device 120 may then store the data, generate the codeword, and store the codeword, after which storage device 120 may send response 715 back to host 105.

At some later point in time, host 105 may send read request 720 to read data 710 back out from storage device 120. Storage device 120 may then attempt to read data 710 from storage, along with the stored codeword, and may use the codeword in combination with the parity check matrix H to determine whether the data is perfect or has errors: if the data has errors, storage device 120 may also use the codeword and parity check matrix H to determine the number of violated linear equations: storage device 120 may then use the number of violated linear equations and data quality metric table 345 of FIG. 3 to determine the data quality metric. Storage device 120 may then return the data quality metric to host 105, as shown by response 725.

Host 105 may then use the data quality metric to decide what action to take. For example, host 105 may simply treat response 725 as indicating that there was an error reading the data from storage device 120, and may proceed based on that information. But in some embodiments, host 105 may resend the read request, shown as read request 730. Read request 730 may specify target data quality level 735 and/or target latency 740, which storage device 120 may then use in deciding what ECC module to select (or to select no ECC module), and whether to return the data with errors (if the data could not be corrected). Once storage device 120 decides what correction (if any) to perform, storage device 120 may perform any selected correction and may send response 745 back to host 105. Response 705 may include corrected data 750, response 705 may include the uncorrected data, or response 705 may return an error, depending on what error correction was (or was not) performed and what information was chosen to send back to host 105.

In FIG. 7, host 105 is shown as sending two read requests 720 and 730 to storage device 120, and storage device 120 is shown as sending two responses 725 and 745. In embodiments of the inventive concept covered by FIG. 7, which may include embodiments were storage device 120 does not have any information about what target data quality metric 735 and/or target latency 740 host 105 may want, even from RRL table 335 of FIG. 5, such an approach is reasonable. But in some embodiments of the inventive concept, if storage device 120 does not have such information, storage device 120 might just assume that host 105 expects perfect data but has no tolerance for the delay imposed by error correction, in which case storage device 120 may simply report an error in response 725 (rather than reporting the data quality metric. In other embodiments of the inventive concept, host 105 may send a request for the data quality level of data 710 as a separate request, rather than storage device 120 returning such information in response to read request 720. And in yet other embodiments of the inventive concept, storage device 120 may receive target data quality metric 735 and/or target latency 740 as part of read request 720 or by accessing such information from RRL table 335 of FIG. 5. In such embodiments of the inventive concept, storage device 120 may simply proceed to perform error correction (or not, depending on error recovery mode selector 350 of FIG. 3), rather than returning the data quality level of data 710 in response 725.

Figure 8A:
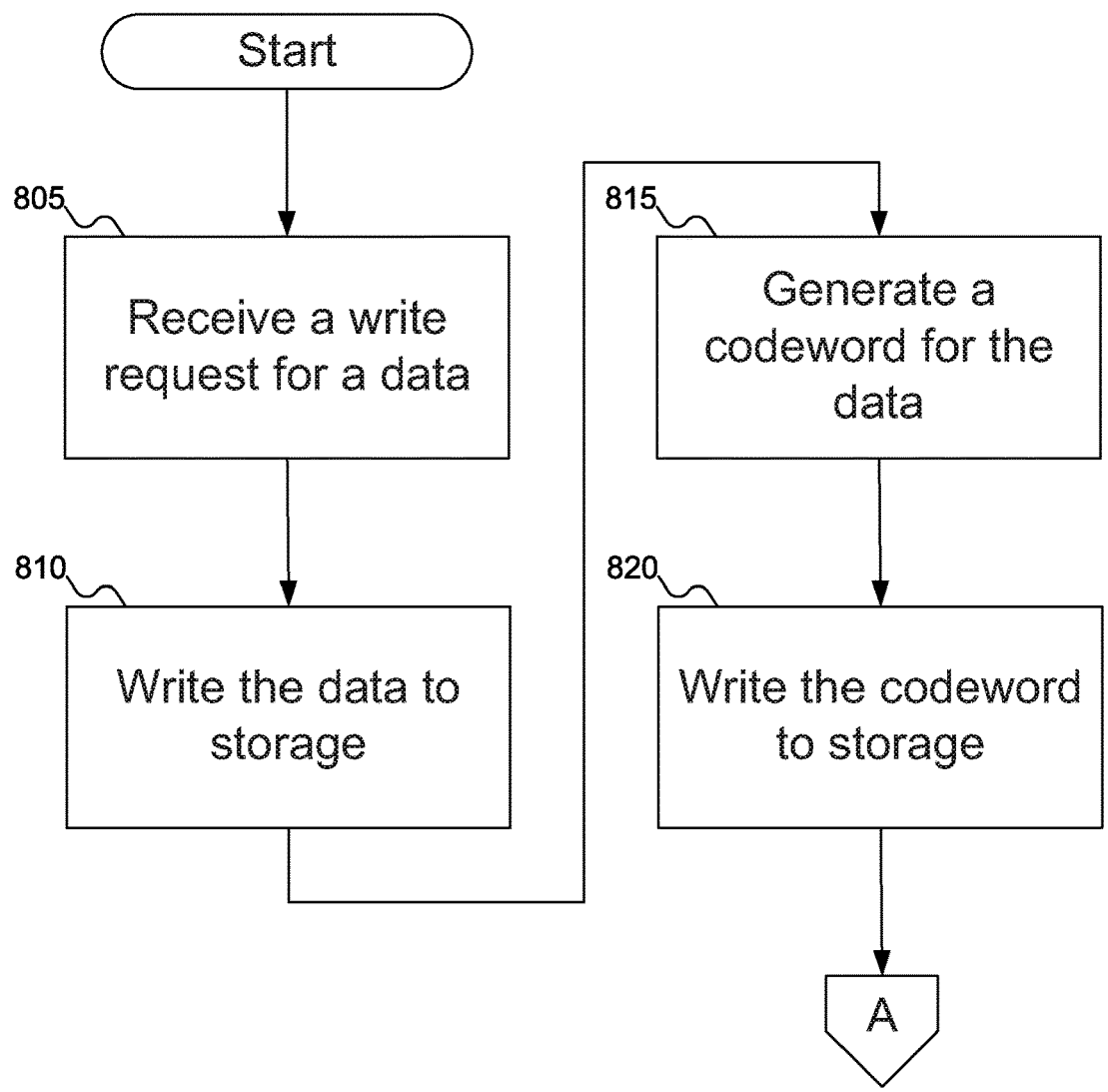
FIGS. 8A-8C show a flowchart of an example procedure for the storage device of FIG. 1 to read data and apply error correction, according to embodiments of the inventive concept.
Figure 8B:
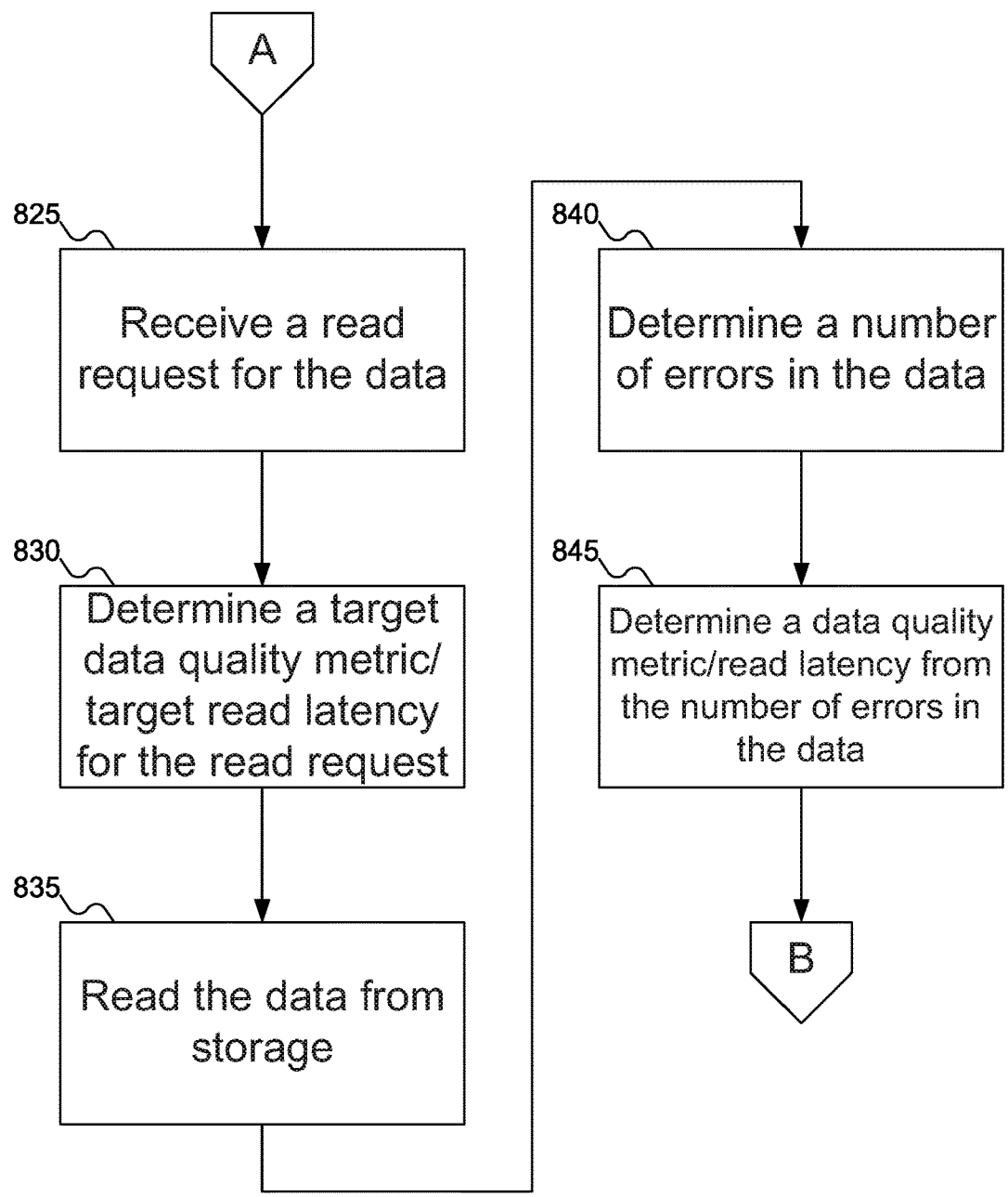
Figure 8C:
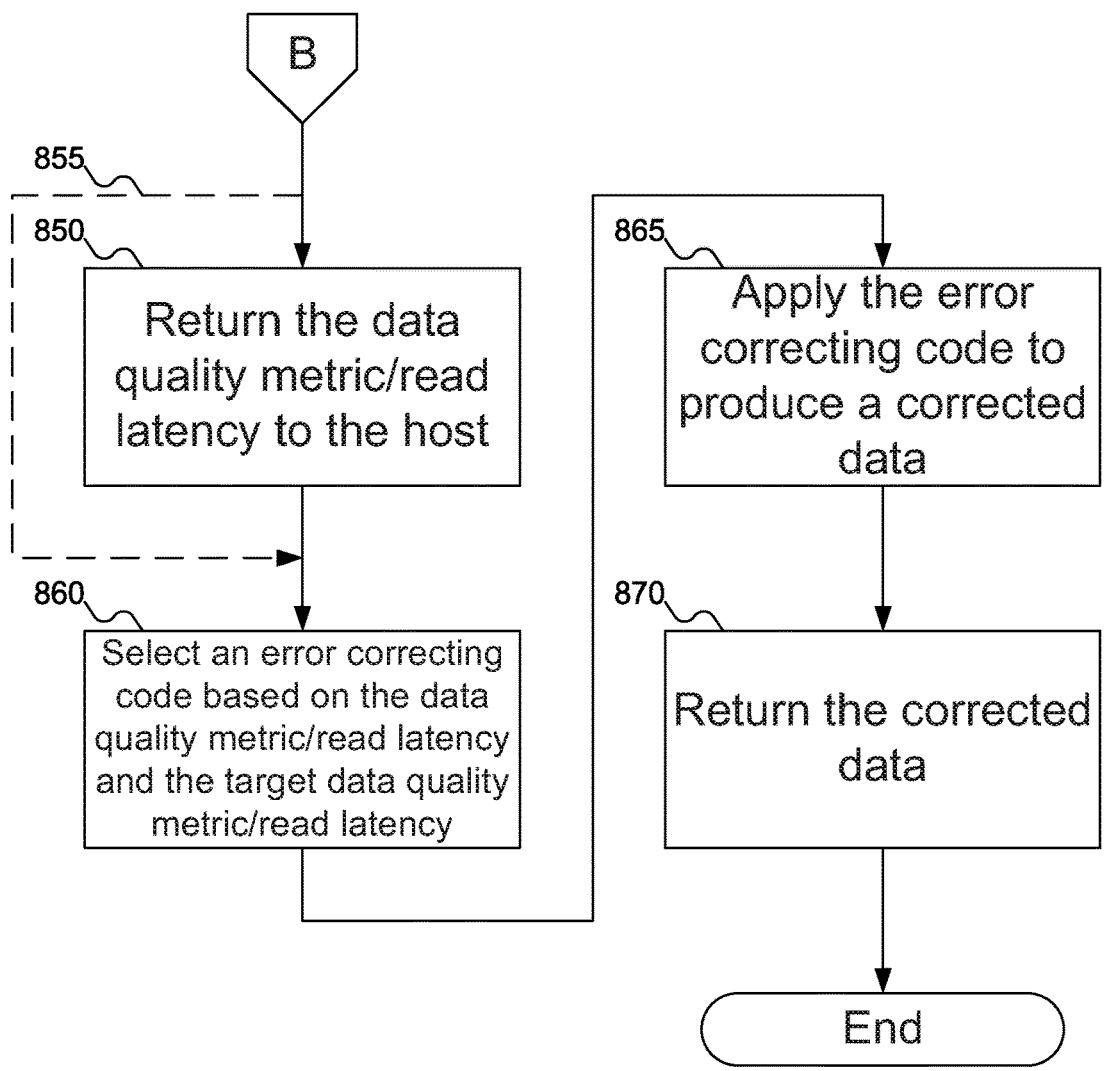

FIGS. 8A-8C show a flowchart of an example procedure for storage device 120 of FIG. 1 to read data and apply error correction, according to embodiments of the inventive concept. In FIG. 8A, at block 805, storage device 120 of FIG. 1 may receive write request 705 of FIG. 7 from host 105 of FIG. 1 to write data 710 of FIG. 7 to flash chips 325-1 through 325-8 of FIG. 3. At block 810, storage device 120 of FIG. 1 may write data 710 of FIG. 7 to flash chips 325-1 through 325-8 of FIG. 3. At block 815, storage device 120 of FIG. 1 may generate a codeword for data 710 of FIG. 7; this codeword may be stored in flash chips 325-1 through 325-8 of FIG. 3 of storage device 120 of FIG. 1 in block 820.

At block 825 (FIG. 8B), storage device 120 of FIG. 1 may receive read request 720 or 730 of FIG. 7 from host 105 of FIG. 1. At block 830, storage device 120 of FIG. 1 may determine target data quality metric 735 of FIG. 7 and/or target latency 740 of FIG. 7 for read request 720 and/or 730 of FIG. 7. At block 835, storage device 120 of FIG. 1 may attempt to read data 710 of FIG. 7 from flash chips 325-1 through 325-8 of FIG. 3. Note that that data might be successfully read but contain errors that result in the data in flash chips 325-1 through 325-8 of FIG. 3 being inaccurate: if any data errors may not be corrected, read request 720 and/or 730 of FIG. 7 might be considered to fail even though data was successfully "read" from flash chips 325-1 through 325-8 of FIG. 3. At block 840, error recovery mode selector 350 of FIG. 3 may determine a number of errors (i.e., a number of violated linear equations) in data 710 of FIG. 7. At block 845, error recovery mode selector 350 of FIG. 3 may map the number of errors (or the number of violated linear equations) to a data quality metric for data 710 of FIG. 7.

At block 850 (FIG. 8C), storage device 120 of FIG. 1 may return the data quality metric for data 710 of FIG. 7, as shown in response 725 of FIG. 7. Block 850 of FIG. 8 may be omitted, as shown by dashed line 855. At block 860, error recovery mode selector 350 of FIG. 3 may select one of ECC modules 355-1 or 355-2 of FIG. 3 (or might select no ECC module if no ECC module is expected to correct the data or if the data is perfect) to apply to data 710 of FIG. 7. At block 865, storage device 120 of FIG. 1 may apply the selected ECC module 355-1 or 355-2 of FIG. 3 (if no ECC module is selected at block 860, then storage device 120 of FIG. 1 may do nothing at block 865). Finally, at block 870, storage device 120 of FIG. 1 may return corrected data 750 of FIG. 7 to host 105 of FIG. 1. (If no error correction was performed because the data was perfect, then data 750 of FIG. 7 may be returned without correction; if no error correction was performed because error correction was not expected to succeed in block 860, then (uncorrected) data 750 may be returned if host 105 of FIG. 1 will tolerate the level of error in the data or an error if host 105 of FIG. 1 will not tolerate the level of error in the data).

Figure 9:
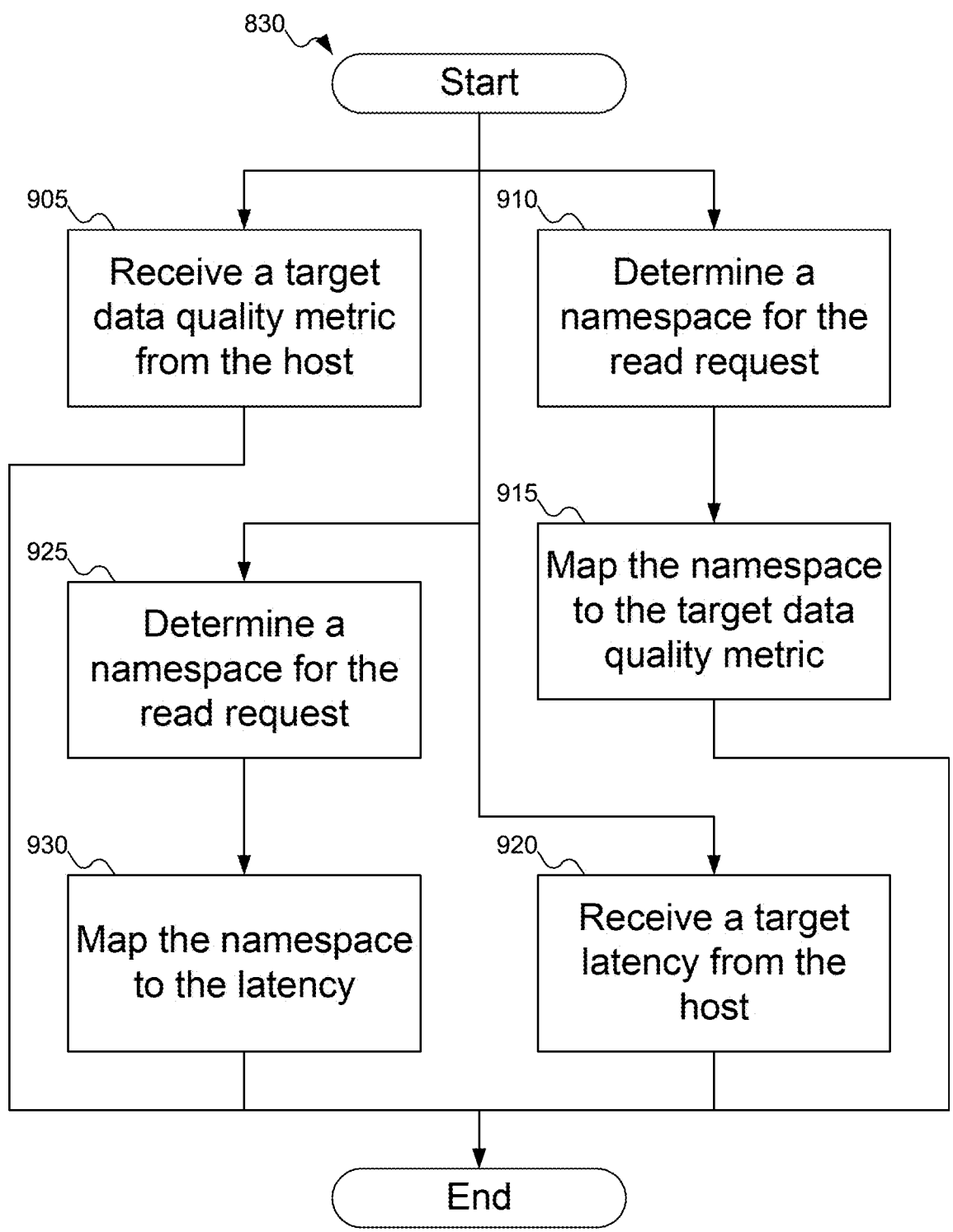
FIG. 9 shows a flowchart of an example procedure for the storage device of FIG. 1 to receive either a target data quality metric or a target latency for a read request, according to embodiments of the inventive concept.

FIG. 9 shows a flowchart of an example procedure for storage device 120 of FIG. 1 to receive either target data quality metric 735 of FIG. 7 or target latency 740 of FIG. 7 for read request 720 or 730 of FIG. 7, according to embodiments of the inventive concept. In FIG. 9, at block 905, storage device 120 of FIG. 1 may receive target data quality metric 735 of FIG. 7 from host 105 of FIG. 1.

Alternatively, at block 910, storage device 120 of FIG. 1 may determine a namespace associated with read request 720 or 730 of FIG. 7. Then, at block 915, using RRL table 345 of FIG. 5, storage device 120 of FIG. 1 may map the namespace to target data quality metric 530 or 550 of FIG. 5.

Alternatively, at block 920, storage device 120 of FIG. 1 may receive target latency 740 of FIG. 7 from host 105 of FIG. 1.

Alternatively, at block 925, storage device 120 of FIG. 1 may determine a namespace associated with read request 720 or 730 of FIG. 7. Then, at block 930, using RRL table 345 of FIG. 5, storage device 120 of FIG. 1 may map the namespace to target latency 525 or 545 of FIG. 5.

Figure 10:
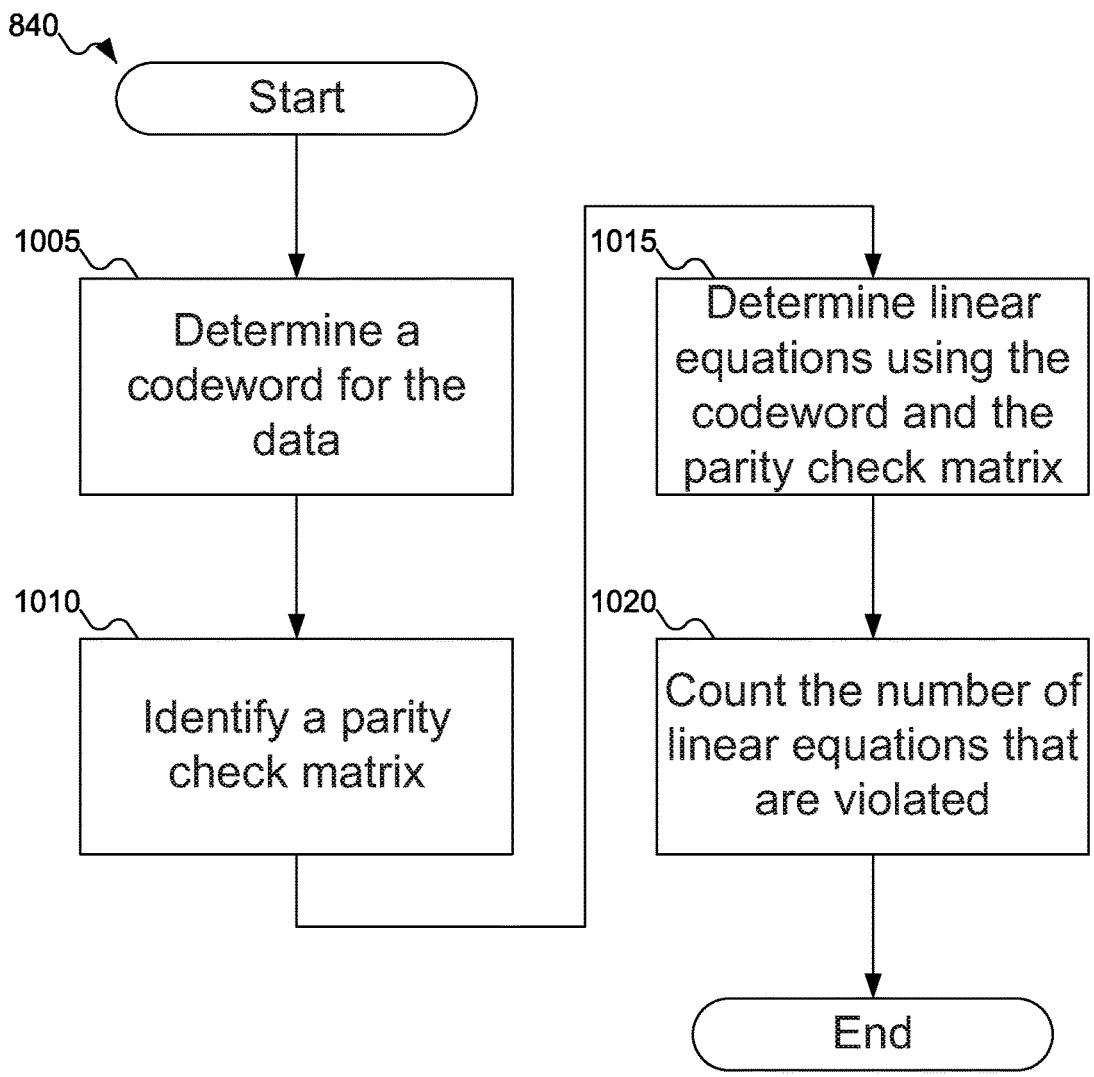
FIG. 10 shows an example procedure for the storage device of FIG. 1 to determine the number of violated check equations, according to an embodiment of the inventive concept.

FIG. 10 shows an example procedure for storage device 120 of FIG. 1 to determine the number of violated check equations, according to an embodiment of the inventive concept. In FIG. 10, at block 1005, error recovery mode selector 350 of FIG. 3 may determine a codeword for data 710 of FIG. 7. At block 1010, error recovery mode selector 350 of FIG. 3 may identify a parity check matrix H. At block 1015, error recovery mode selector 350 of FIG. 3 may determine the linear equations based on the codeword and the parity check matrix H. Finally, at block 1020, error recovery mode selector 350 of FIG. 3 may count the number of linear equations that are violated.

In FIGS. 8A-10, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. The storage device may determine a data quality metric for data being read from the storage device. This data quality metric may be determined based on a number of violated linear equations based on a parity check matrix H and a codeword for the data. This data quality metric may then be used to select an error correcting code module to apply to the data. By selecting one error correcting code module, latency may be reduced when compared with trying multiple error correcting code modules in sequence. Similarly, by selecting one error correcting code module, power consumption may be reduced when compared with trying multiple error correcting code modules in sequence. In addition, the data quality metric may be compared with a data quality metric for the data as determined by the host, which may reflect that the host may tolerate some errors in the data: if the data has a sufficiently high data quality, the data may be returned to the host without correction (i.e., with errors).

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to embodiments of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. Embodiments of the inventive concept include a storage device, comprising:
   storage for data;
   a controller to manage writing the data to the storage and reading the data from the reading storage;
   a data quality metric table to map a first number of errors to a first data quality metric and map a second number of errors to a second data quality metric; and
   a transmitter to return the data quality metric table to a host.

Statement 2. Embodiments of the inventive concept include the storage device according to statement 1, wherein the storage device includes a Solid State Drive (SSD).

Statement 3. Embodiments of the inventive concept include the storage device according to statement 1, wherein:
   the controller is configured to receive from the host a read request to read a first data from the storage; and
   the storage device further comprises a data quality metric estimator to estimate the first number of errors in the first data.

Statement 4. Embodiments of the inventive concept include the storage device according to statement 3, wherein the transmitter is configured to return the first number of errors in the first data to the host.

Statement 5. Embodiments of the inventive concept include the storage device according to statement 3, wherein the transmitter is operative to return the first data quality metric to the host based at least in part on the first number of errors and the data quality metric table.

Statement 6. Embodiments of the inventive concept include the storage device according to statement 3, further comprising:
   a first error correcting code (ECC) module;
   a second ECC module; and
   an error recovery mode selector to select the first ECC module based at least in part on the first number of errors and the data quality metric table.

Statement 7. Embodiments of the inventive concept include the storage device according to statement 6, wherein:
   the controller is operative to receive from the host a target data quality metric for the read request; and
   the error recovery mode selector is configured to select the first ECC module based at least in part on the first number of errors, the data quality metric table, and the target data quality metric.

Statement 8. Embodiments of the inventive concept include the storage device according to statement 7, wherein the error recovery mode selector is configured to not select either the first ECC module or the second ECC module based at least in part on the target data quality metric exceeding the first data quality metric.

Statement 9. Embodiments of the inventive concept include the storage device according to statement 6, wherein:
the storage device further comprises a read recovery level (RRL) table mapping a namespace to an RRL and a target data quality metric; and
the controller is configured to access the target data quality metric from the RRL table.

Statement 10. Embodiments of the inventive concept include the storage device according to statement 6, wherein:
the data quality metric table is configured to map the first number of errors to a first read latency and to map the second number of errors to a second read latency;
the controller is operative to receive from the host a target read latency for the read request; and
the error recovery mode selector is configured to select the first ECC module based at least in part on the first number of errors, the data quality metric table, and the target read latency.

Statement 11. Embodiments of the inventive concept include the storage device according to statement 10, wherein the error recovery mode selector is configured to not select either the first ECC module or the second ECC module based at least in part on the first read latency exceeding the target read latency.

Statement 12. Embodiments of the inventive concept include the storage device according to statement 6, wherein:
the storage device further comprises an RRL table mapping a namespace to an RRL and a target read latency; and
the controller is configured to access the target read latency from the RRL table.

Statement 13. Embodiments of the inventive concept include the storage device according to statement 3, wherein the data quality metric estimator includes a counter for a number of linear equations that are violated, the number of linear equations using a parity check matrix and a codeword for the first data.

Statement 14. Embodiments of the inventive concept include the storage device according to statement 13, wherein the data quality metric estimator is configured to determine a bit error rate (BER) for the first data from the number of linear equations that are violated.

Statement 15. Embodiments of the inventive concept include the storage device according to statement 1, wherein the controller is configured to write the first data to the storage based at least in part on a write request from the host.

Statement 16. Embodiments of the inventive concept include the storage device according to statement 15, wherein the controller is further configured to write a codeword to the storage based on the first data.

Statement 17. Embodiments of the inventive concept include the storage device according to statement 1, further comprising an RRL table mapping a namespace to an RRL and a target data quality metric.

Statement 18. Embodiments of the inventive concept include the storage device according to statement 17, wherein the RRL table maps the namespace to a target read latency.

Statement 19. Embodiments of the inventive concept include a method, comprising:
receiving a read request for a data from a host at a storage device;
determining a target data quality metric for the read request by the storage device;
reading the data from the storage device;
determining a number of errors in the data by the storage device;
selecting a first error correcting code (ECC) module from the first ECC module and a second ECC module based at least in part on the number of errors in the data by the storage device;
applying the first ECC module to the data, producing a corrected data by the storage device; and
returning the corrected data to the host from the storage device.

Statement 20. Embodiments of the inventive concept include the method according to statement 19, wherein the storage device includes a Solid State Drive (SSD).

Statement 21. Embodiments of the inventive concept include the method according to statement 19, wherein:
the method further comprises determining a data quality metric based at least in part on the number of errors in the data by the storage device; and
selecting the first ECC module from the first ECC module and the second ECC module includes selecting the first ECC module from the first ECC module and the second ECC module based at least in part on the data quality metric.

Statement 22. Embodiments of the inventive concept include the method according to statement 21, wherein determining the data quality metric based at least in part on the number of errors in the data by the storage device includes determining the data quality metric based at least in part on the number of errors in the data by the storage device using a data quality metric table.

Statement 23. Embodiments of the inventive concept include the method according to statement 21, wherein:
determining the target data quality metric for the read request by the storage device includes receiving the target data quality metric from the host at the storage device; and
selecting the first ECC module from the first ECC module and the second ECC module based at least in part on the data quality metric includes selecting the first ECC module from the first ECC module and the second ECC module based at least in part on the data quality metric exceeding the target data quality metric.

Statement 24. Embodiments of the inventive concept include the method according to statement 21, wherein:
receiving the read request for the data from the host at the storage device includes accessing the target data quality metric from a read recovery level (RRL) table by the storage device; and
selecting the first ECC module from the first ECC module and the second ECC module based at least in part on the data quality metric includes selecting the first ECC module from the first ECC module and the second ECC module based at least in part on the data quality metric exceeding the target data quality metric.

Statement 25. Embodiments of the inventive concept include the method according to statement 24, wherein accessing the target data quality metric from the RRL table by the storage device includes:
determining a namespace for the read request;
mapping the namespace to the target data quality metric using the RRL table.

Statement 26. Embodiments of the inventive concept include the method according to statement 19, wherein:
the method further comprises determining a read latency based at least in part on the number of errors in the data by the storage device; and selecting the first ECC module from the first ECC module and the second ECC module includes selecting the first ECC module from the first ECC module and the second ECC module based at least in part on the read latency.

Statement 27. Embodiments of the inventive concept include the method according to statement 26, wherein determining the read latency based at least in part on the number of errors in the data by the storage device includes determining the read latency based at least in part on the number of errors in the data by the storage device using a data quality metric table.

Statement 28. Embodiments of the inventive concept include the method according to statement 26, wherein:
  determining the target data quality metric for the read request by the storage device includes receiving a target read latency from the host at the storage device; and
  selecting the first ECC module from the first ECC module and the second ECC module based at least in part on the read latency includes selecting the first ECC module from the first ECC module and the second ECC module based at least in part on the target read latency exceeding the read latency.

Statement 29. Embodiments of the inventive concept include the method according to statement 26, wherein:
  determining the target data quality metric for the read request by the storage device includes accessing the target read latency from an RRL table by the storage device; and
  selecting the first ECC module from the first ECC module and the second ECC module based at least in part on the read latency includes selecting the first ECC module from the first ECC module and the second ECC module based at least in part on the target read latency exceeding the read latency.

Statement 30. Embodiments of the inventive concept include the method according to statement 29, wherein accessing the target read latency from the RRL table by the storage device includes:
  determining a namespace for the read request;
  mapping the namespace to the target read latency using the RRL table.

Statement 31. Embodiments of the inventive concept include the method according to statement 19, further comprising:
  determining a data quality metric based at least in part on the number of errors in the data by the storage device; and
  returning the data quality metric to the host.

Statement 32. Embodiments of the inventive concept include the method according to statement 19, wherein determining the number of errors in the data by the storage device includes:
  determining a first number of linear equations; and
  determining a second number of the linear equations that are violated.

Statement 33. Embodiments of the inventive concept include the method according to statement 32, wherein determining the first number of linear equations includes:
  determining a codeword for the data; and
  determining the first number of linear equations based at least in part on a parity check matrix and the codeword.

Statement 34. Embodiments of the inventive concept include the method according to statement 33, further comprising:
  receiving a write request for the data from the host at the storage device;
  writing the data to the storage device;
  generating the codeword based at least in part on the data; and
  writing the codeword to the storage device.

Statement 35. Embodiments of the inventive concept include an article, comprising a non-transitory storage medium, the non-transitory storage medium having stored thereon instructions that, when executed by a machine, result in:
  receiving a read request for a data from a host at a storage device;
  determining a target data quality metric for the read request by the storage device;
  reading the data from the storage device;
  determining a number of errors in the data by the storage device;
  selecting a first error correcting code (ECC) module from the first ECC module and a second ECC module based at least in part on the number of errors in the data by the storage device;
  applying the first ECC module to the data, producing a corrected data by the storage device; and
  returning the corrected data to the host from the storage device.

Statement 36. Embodiments of the inventive concept include the article according to statement 35, wherein the storage device includes a Solid State Drive (SSD).

Statement 37. Embodiments of the inventive concept include the article according to statement 35, wherein:
  the non-transitory storage medium has stored thereon further instructions that, when executed by the machine, result in determining a data quality metric based at least in part on the number of errors in the data by the storage device; and
  selecting the first ECC module from the first ECC module and the second ECC module includes selecting the first ECC module from the first ECC module and the second ECC module based at least in part on the data quality metric.

Statement 38. Embodiments of the inventive concept include the article according to statement 37, wherein determining the data quality metric based at least in part on the number of errors in the data by the storage device includes determining the data quality metric based at least in part on the number of errors in the data by the storage device using a data quality metric table.

Statement 39. Embodiments of the inventive concept include the article according to statement 37, wherein:
  determining the target data quality metric for the read request by the storage device includes receiving the target data quality metric from the host at the storage device; and
  selecting the first ECC module from the first ECC module and the second ECC module based at least in part on the data quality metric includes selecting the first ECC module from the first ECC module and the second ECC module based at least in part on the data quality metric exceeding the target data quality metric.

Statement 40. Embodiments of the inventive concept include the article according to statement 37, wherein:
  receiving the read request for the data from the host at the storage device includes accessing the target data quality metric from a read recovery level (RRL) table by the storage device; and
  selecting the first ECC module from the first ECC module and the second ECC module based at least in part on the data quality metric includes selecting the first ECC module from the first ECC module and the second ECC module based at least in part on the data quality metric exceeding the target data quality metric.

Statement 41. Embodiments of the inventive concept include the article according to statement 40, wherein accessing the target data quality metric from the RRL table by the storage device includes:
determining a namespace for the read request;
mapping the namespace to the target data quality metric using the RRL table.

Statement 42. Embodiments of the inventive concept include the article according to statement 35, wherein:
the non-transitory storage medium has stored thereon further instructions that, when executed by the machine, result in determining a read latency based at least in part on the number of errors in the data by the storage device; and
selecting the first ECC module from the first ECC module and the second ECC module includes selecting the first ECC module from the first ECC module and the second ECC module based at least in part on the read latency.

Statement 43. Embodiments of the inventive concept include the article according to statement 42, wherein determining the read latency based at least in part on the number of errors in the data by the storage device includes determining the read latency based at least in part on the number of errors in the data by the storage device using a data quality metric table.

Statement 44. Embodiments of the inventive concept include the article according to statement 42, wherein:
determining the target data quality metric for the read request by the storage device includes receiving a target read latency from the host at the storage device; and
selecting the first ECC module from the first ECC module and the second ECC module based at least in part on the read latency includes selecting the first ECC module from the first ECC module and the second ECC module based at least in part on the target read latency exceeding the read latency.

Statement 45. Embodiments of the inventive concept include the article according to statement 42, wherein:
determining the target data quality metric for the read request by the storage device includes accessing the target read latency from an RRL table by the storage device; and
selecting the first ECC module from the first ECC module and the second ECC module based at least in part on the read latency includes selecting the first ECC module from the first ECC module and the second ECC module based at least in part on the target read latency exceeding the read latency.

Statement 46. Embodiments of the inventive concept include the article according to statement 45, wherein accessing the target read latency from the RRL table by the storage device includes:
determining a namespace for the read request;
mapping the namespace to the target read latency using the RRL table.

Statement 47. Embodiments of the inventive concept include the article according to statement 35, the non-transitory storage medium having stored thereon further instructions that, when executed by the machine, result in:
determining a data quality metric based at least in part on the number of errors in the data by the storage device; and
returning the data quality metric to the host.

Statement 48. Embodiments of the inventive concept include the article according to statement 35, wherein determining the number of errors in the data by the storage device includes:
determining a first number of linear equations; and
determining a second number of the linear equations that are violated.

Statement 49. Embodiments of the inventive concept include the article according to statement 48, wherein determining the first number of linear equations includes:
determining a codeword for the data; and
determining the first number of linear equations based at least in part on a parity check matrix and the codeword.

Statement 50. Embodiments of the inventive concept include the article according to statement 49, the non-transitory storage medium having stored thereon further instructions that, when executed by the machine, result in:
receiving a write request for the data from the host at the storage device;
writing the data to the storage device;
generating the codeword based at least in part on the data; and
writing the codeword to the storage device.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage device, comprising:
storage for a data;
a controller to manage writing the data to the storage and reading the data from the storage;
a data structure to associate a first property based at least in part on a first read request with a first quality metric and to associate a second property based at least in part on a second read request with a second quality metric; and
a transmitter to return the data structure.

2. The storage device according to claim 1, wherein:
the controller is configured to receive the first read request to read the data from the storage; and
the storage device further comprises a quality estimator to estimate the first property of the data.

3. The storage device according to claim 2, wherein:
the controller is operative to receive a target quality metric for the first read request; and
the storage device further comprises:
a first module;
a second module; and
a mode selector to select the first module from the first module and the second module based at least in part on the target quality metric.

4. The storage device according to claim 2, further comprising:
a module;
a second module; and
a mode selector to select the first module from the first module and the second module based at least in part on the first property and the data structure.

5. The storage device according to claim 4, wherein:
the storage device further comprises a second data structure to associate a namespace with a target quality metric; and the controller is configured to access the target quality metric from the second data structure.

6. The storage device according to claim 4, wherein:
the data structure is configured to associate the first property with a first read latency and to associate the second property with a second read latency;
the controller is operative to receive a target read latency for the first read request; and
the mode selector is configured to select the first module from the first module and the second module based at least in part on the data structure and the target read latency.

7. The storage device according to claim 6, wherein:
the first read latency is associated with the first module; and
the second read latency is associated with the second module.

8. The storage device according to claim 4, wherein:
the storage device further comprises second data structure to associate a namespace with a target read latency; and
the controller is configured to access the target read latency from the second data structure.

9. The storage device according to claim 2, wherein the quality estimator includes a counter for a property of equations that are violated, the property of equations using a parity check matrix and a codeword for the data.

10. The storage device according to claim 1, further comprising a second data structure to associate a namespace with a target quality metric or a target read latency.

11. A method, comprising:
receiving a read request for a data at a storage device;
determining a target quality metric for the read request by the storage device;
reading the data from the storage device;
selecting a first module from the first module and a second module based at least in part on the target quality metric by the storage device;
applying the first module to the data, producing a modified data by the storage device; and
returning the modified data from the storage device.

12. The method according to claim 11, wherein determining the target quality metric for the read request by the storage device includes receiving the target quality metric at the storage device.

13. The method according to claim 11, wherein determining the target quality metric for the read request by the storage device includes accessing the target quality metric from a data structure by the storage device.

14. The method according to claim 11, wherein:
the method further comprises determining a property of the data by the storage device; and
selecting the first module from the first module and the second module includes selecting the first module from the first module and the second module based at least in part on the target quality metric and the property of the data.

15. The method according to claim 14, wherein:
determining the property of the data by the storage device includes determining a quality metric by the storage device; and
selecting the first module from the first module and the second module based at least in part on the target quality metric and the property of the data includes selecting the first module from the first module and the second module based at least in part on the quality metric exceeding the target quality metric.

16. The method according to claim 15, wherein:
the target quality metric includes a target read latency; and
the quality metric includes a read latency.

17. The method according to claim 16, wherein:
determining the target quality metric for the read request by the storage device includes receiving a target read latency at the storage device; and
selecting the first module from the first module and the second module based at least in part on the read latency includes selecting the first module from the first module and the second module based at least in part on the target read latency exceeding the read latency.

18. The method according to claim 16, wherein:
determining the target quality metric for the read request by the storage device includes accessing the target read latency from a data structure by the storage device; and
selecting the first module from the first module and the second module based at least in part on the read latency includes selecting the first module from the first module and the second module based at least in part on the target read latency exceeding the read latency.

19. An article, comprising a non-transitory storage medium, the non-transitory storage medium having stored thereon instructions that, when executed by a machine, result in:
receiving a read request for a data at a storage device;
determining a target quality metric for the read request by the storage device;
reading the data from the storage device;
selecting a first module from the first module and a second module based at least in part on the target quality metric by the storage device;
applying the first module to the data, producing a modified data by the storage device; and
returning the modified data from the storage device.

20. The article according to claim 19, wherein:
the non-transitory storage medium has stored thereon further instructions that, when executed by the machine, result in determining a property of the data by the storage device; and
selecting the first module from the first module and the second module includes selecting the first module from the first module and the second module based at least in part on the target quality metric and the property of the data.

* * * * *